United States Patent [19]
Engelberger et al.

[11] Patent Number: 5,973,424
[45] Date of Patent: Oct. 26, 1999

[54] PROCESS FOR INSULATING THE STATOR OF AN ELECTRONICALLY SWITCHED D.C. MOTOR

[75] Inventors: Reimund Engelberger, St. Georgen; Jürgen Kieninger, Mönchweiler, both of Germany

[73] Assignee: Papst-Motoren GmbH & Co. KG, St. Georgen, Germany

[21] Appl. No.: 09/091,929

[22] PCT Filed: Oct. 23, 1997

[86] PCT No.: PCT/EP97/05852

§ 371 Date: Jun. 24, 1998

§ 102(e) Date: Jun. 24, 1998

[87] PCT Pub. No.: WO98/19382

PCT Pub. Date: May 7, 1998

[30] Foreign Application Priority Data

Oct. 28, 1996 [DE] Germany ............................ 196 44 341

[51] Int. Cl.⁶ ........................................................ H02K 1/04
[52] U.S. Cl. ........................ 310/43; 310/67 R; 264/272.2; 29/596
[58] Field of Search .................................... 310/67 R, 43; 264/272.2, 272.19; 29/596

[56] References Cited

U.S. PATENT DOCUMENTS

| | | | |
|---|---|---|---|
| 4,922,604 | 5/1990 | Marshall et al. | 29/598 |
| 5,552,650 | 9/1996 | Cap et al. | 310/67 R |
| 5,806,169 | 9/1998 | Trago et al. | 29/596 |

FOREIGN PATENT DOCUMENTS

| | | |
|---|---|---|
| 31 23 814 A1 | 4/1982 | Germany . |
| 2 221 583 | 2/1990 | United Kingdom . |
| WO 96-31936 | 10/1996 | WIPO . |

OTHER PUBLICATIONS

Henkel Corp. Chemicals Group, kankakee, IL, Macromelt 6797 (Dimer Acid Based Polyamide Resin) Material Safety Data Sheet # 4611, revised Mar. 26, 1998.

Derwent WPI abstract of De 37 37 050–A1, Elasser/Papst, publ. May 5, 1988.

Patent Abstracts of Japan, vol. 18, No. 167 (E–1528), re Furukawa/Fuji Electric, Dec. 17, 1993.

Derwent WPI Abstract of JP 5–336 722–A, Fuji Electric application filed Dec. 17, 1993.

Patent Abstracts of Japan, vol. 95, No. 6, re Doi/Matsushita, Mar. 17, 1995.

Derwent WPI abstract of JP 7–075 288–A, Doi/Matsushita application filed Mar. 17, 1995.

Derwent WPI abstract of WO 96–31936, Byrnes–Neal–Trago/DuPont, publ. Oct. 10, 1996.

Satz–Rechen–Zentrum (SRZ)–Berlin flyer re DIN (German Industrial Standards) available on CD–ROM.

Deutsches Institut für Normung e.V. (German Institute of Standards) & Verband Deutsche Elektrotechniker (VDE) e.V. (Federation of German Electrical Engineers), German Industrial Norm DIN/VDE 0470 IP–54 (corresponding to European Norm EN 60 529), Cover page & pp. 5–7 (©Nov. 1992).

*Primary Examiner*—Nestor Ramirez
*Assistant Examiner*—Saeed Ghahramawi
*Attorney, Agent, or Firm*—Milton Oliver; Ware, Fressola, Van Der Sluys & Adolphson LLP

[57] ABSTRACT

The present invention is directed to a method of insulating the stator of an electronically commutated direct current motor, in order to also fulfill high insulation and protection requirements. This method comprises the following steps:

the stator (1) is introduced into a closable form with laterally retractable jaws (21);

the form is closed, wherein it encloses the outer contours of the stator (1) including the printed circuit board (11), with a spacing, at least in regions;

a thermoplastic hot-melt adhesive based on polyamide is injected under pressure into the form;

the form is opened and the extrusion-coated stator (1) is removed.

14 Claims, 3 Drawing Sheets

PROCESS FOR INSULATING THE STATOR OF AN ELECTRONICALLY SWITCHED D.C. MOTOR

BACKGROUND

The invention relates to a method or insulating the stator of an electronically commutated direct current motor, an apparatus for carrying out such a method, and a stator that is manufactured in accordance with this method.

In electric motors that are used in so-called clean rooms, or in a humid or aggressive environment, it is necessary to provide the sensitive parts of the motor, such as the winding and the printed circuit board, with a protective coating. It is therefore known, e.g. from DE 37 37 050 A1, ELASSER/PAPst, published, May 5, 1988, to cast artificial resin around the stator of an electric motor. The object in the present disclosure lies essentially in simplifying the production of the bond or connection between the stator winding and the printed circuit board.

Carrying out a powder coating is also known. The known methods not only require mechanical finishing, but are also not in a position to fulfill the requirements of higher insulation classes (e.g. protection type DIN/VDE 0470 IP-54) German Industrail Norm

SUMMARY OF THE INVENTION

The object of the invention is to provide a method for insulating stators, which fulfills even extreme insulation and protection requirements for electric motors.

This object is achieved according to the invention by placing the stator and an associated circuit in an injection-molding die having laterally movable jaws, closing the movable jaws to define a chamber having walls closely surrounding the stator and circuit, injecting a liquid hot thermoplastic into the chamber to thereby form a thin coating over the stator and circuit, pausing until the thermoplastic has solidified, and retracting the movable jaws and removing the thus-insulated stator and circuit.

DETAILED DESCRIPTION

Figure 1:
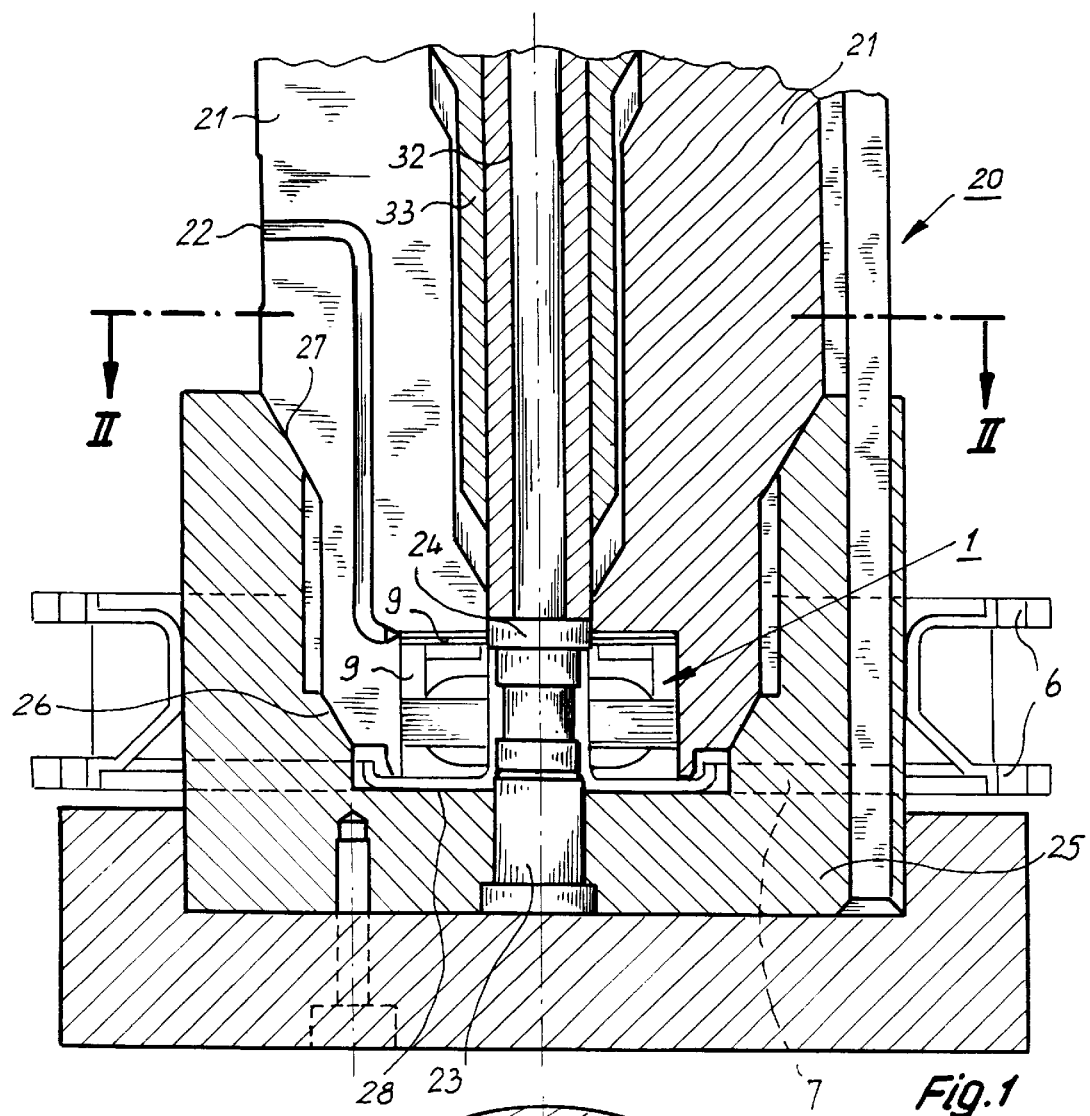
FIG. 1 depicts a section through an injection molding tool (schematically)

In FIG. 1, an injection molding die 20, for manufacturing a stator 1 according to the invention, is schematically represented in a sectional view. In this instance, the injection molding form comprises for example, three laterally retractable jaws 21 (FIG. 2) that are disposed around the lamination bundle 2 of the stator 1. A supply line 22, for injecting the plastic, is disposed between two of the jaws 21. The centering of the stator 1 is carried out on one end by a centering mandrel 23, which protrudes conically or in a true-to-fit manner into the bearing seat 3 of a bearing support tube 4 (FIGS. 3, 5, 6), and it is axially fixed or immobilized on the other end by a ram 24. As a result, during the injection molding process, plastic is prevented from penetrating into the bearing support tube 4. The injection of the thermoplastic hot-melt adhesive used here takes place at approximately 200° C.

The jaws 21 rest with axial pressure against a flange 5 and thus produce a seal. An additional sealing is obtained by means of the ram 24, which together with the closed jaws 21, defines a hollow space. Thereby, one achieves the result that no hot-melt adhesive is injected outside this flange 5.

In a recess, a receptacle portion 25 of the injection molding die 20 contains the centering mandrel 23, conical faces 26, 27 which serve to guide the jaws 21, and a floor 28. Slots, not shown, permit the insertion of ribs 7 (FIG. 4) of a fan housing 6 into the receptacle part 25. The fan housing 6, shown in FIGS. 3–4 and 6 by way of example, comprises a bearing support tube 4 and a flange 5, and is integrally formed as a single plastic part.

After insertion of the stator 1, which rests on the floor 28 of the recess of the receptacle portion 25, the jaws 21 and the ram 24 are moved up to a stop, and define a form that encloses the stator with a small spacing. Then, the plastic is injected under pressure via the supply line 22 into the above-described form and thus produces a cover or insulating sheath 9 (shown cross-hatched).

Figure 6:
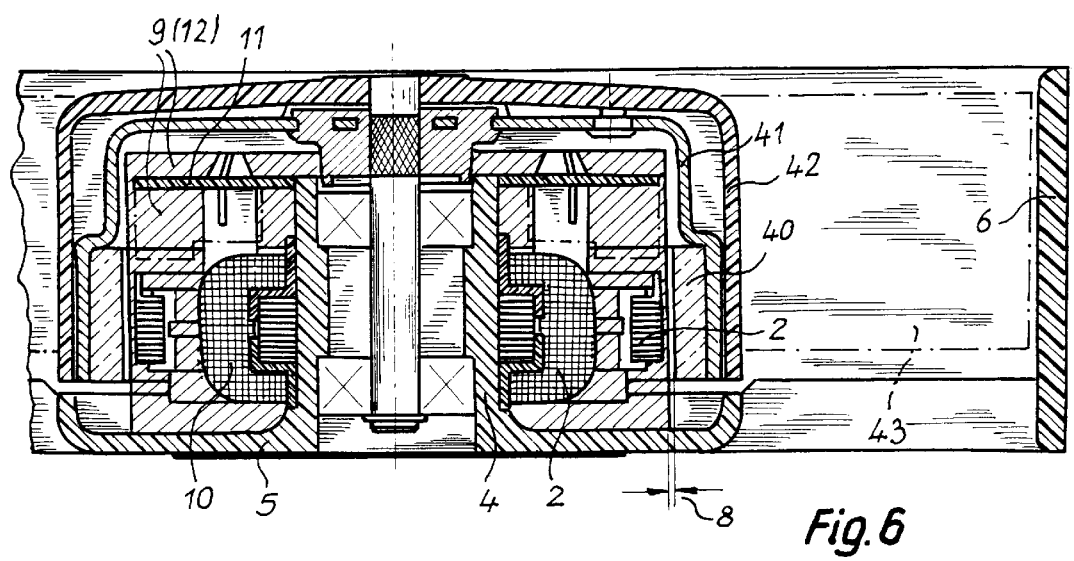
FIG. 6 is a section through a stator, with an insulating coating, which is mounted in a fan.

The air gap 8 between the rotor and the stator is represented in FIG. 6, bottom right by means of double arrows. In order to insulate the stator 1 of the external rotor motor, the air-gap-adjacent side of the stator 1 is enclosed by the form with a spacing that is smaller than the air gap that exists in this motor during operation. After a short pause, which can be shortened further by means of additional cooling of the form, the form is opened and the extrusion-coated stator 1 is removed. The removal from the form is significantly facilitated because at least three jaws 21 (FIG. 2) can retract laterally (essentially in the radial direction).

Preferably, thermoplastics based on polyamide, in particular hot-melt adhesives, are used as the plastic for the coating 9. For the hot-melt adhesive, the following materials are preferred: polyamides; co-polyamides; co-polyesters, high or low pressure polyethylenes; ethylene vinyl acetates; polyesters; ethylene acrylic acid-acrylic acid esters (EAA); terpolyamides; ethylene vinyl acetate-acrylic acid terpolymers.

Depending upon the requirements for the intended use, the most suitable plastic can be selected. So, for the exemplary embodiment depicted in FIGS. 3 to 6 (for the insulating coating 9 of the stator 1 of an electronically commutated direct current motor in a fan), a thermoplastic hot-melt adhesive based on polyamide is used, with the name MACROMELT 6790 from the Henkel company of Düsseldorf, Germany and Kankakee, Illinois. This plastic can be injected at relatively low pressure, and adheres well to the various materials of which the stator 1 is comprised. The fulfillment of these requirements is required, since it concerns an electronically commutated direct current motor.

Figure 5:
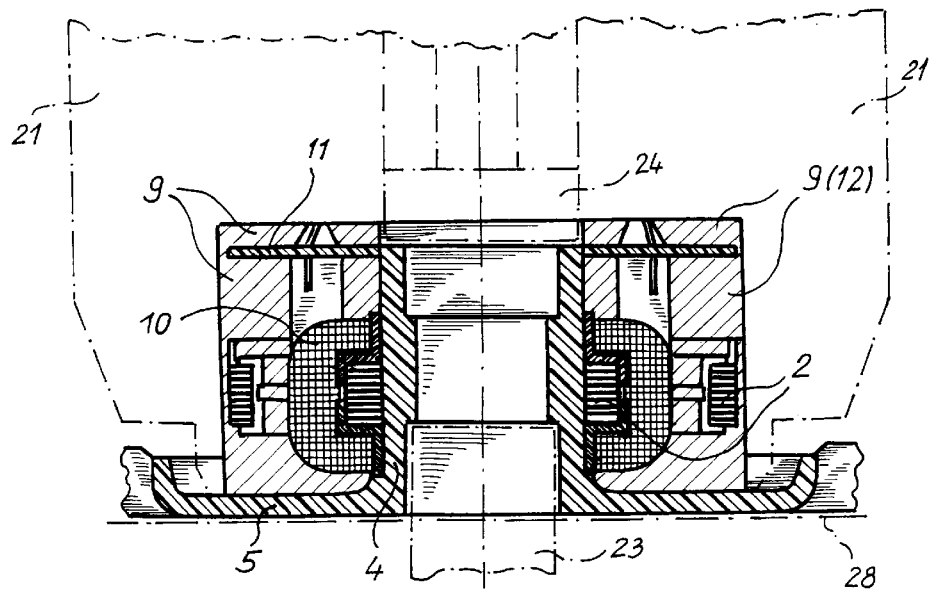
FIG. 5 is a section through a stator according to the invention, with an insulating coating.

This known motor will be described only insofar as is required for the comprehension of this invention. The stator 1 is as shown in FIGS. 5–6 essentially comprised of a lamination packet 2, a winding 10, and a printed circuit board 11, and is fastened to the outer circumference of the bearing support tube 4. Position-sensitive electronic components are disposed on the printed circuit board 11 and these components would be moved by an excessive injection pressure, thus rendering the motor unusable. In addition, the plastic for the cover of the printed circuit board 11 must be flexible so that, for example, SMD (Surface-Mounted-Device) components are not knocked off.

Figure 2:
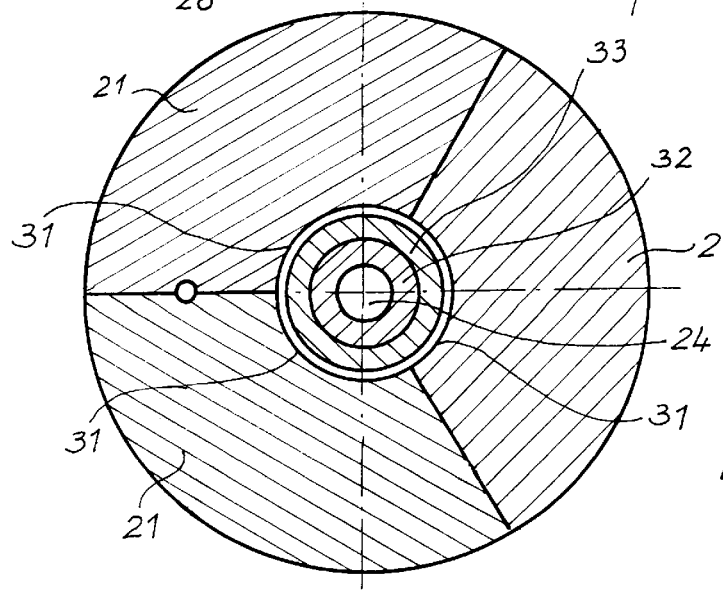
FIG. 2 is a section along the line II—II in FIG. 1.

In FIG. 2, the three jaws 21 of the die 20 are shown sectionally in the closed position, wherein the interior space 31 defined by jaws 21 limits the outer diameter of the coating of the stator 1. The shaft of the ram 24 is enclosed by a protective sleeve 32 and this is enclosed by a guide bushing 33. The guide bushing 33 constitutes the radial stop for the jaws 21.

Figure 3:
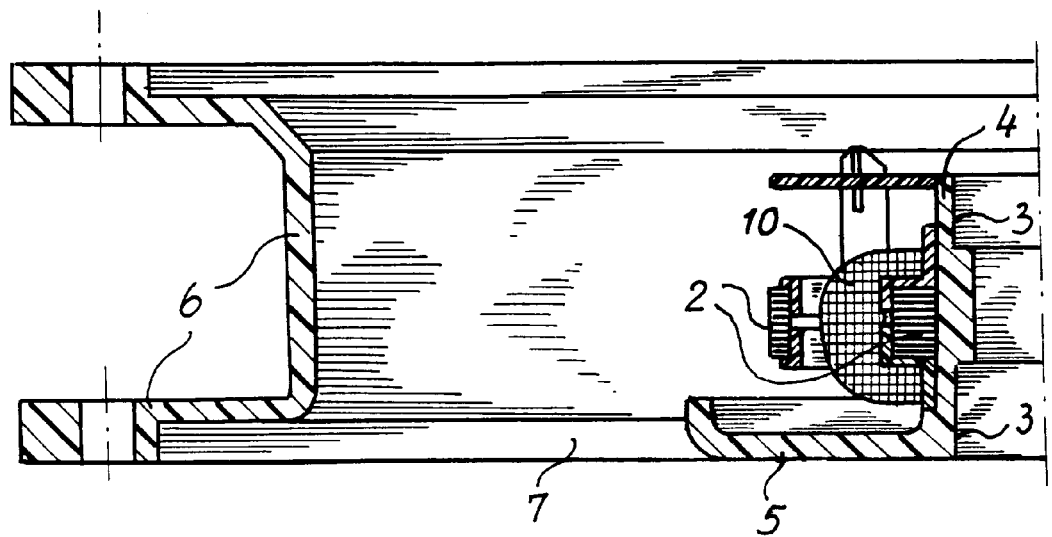
FIG. 3 is a section through a stator, without insulating coating, of a fan, along the line III—III in FIG. 4.
Figure 4:
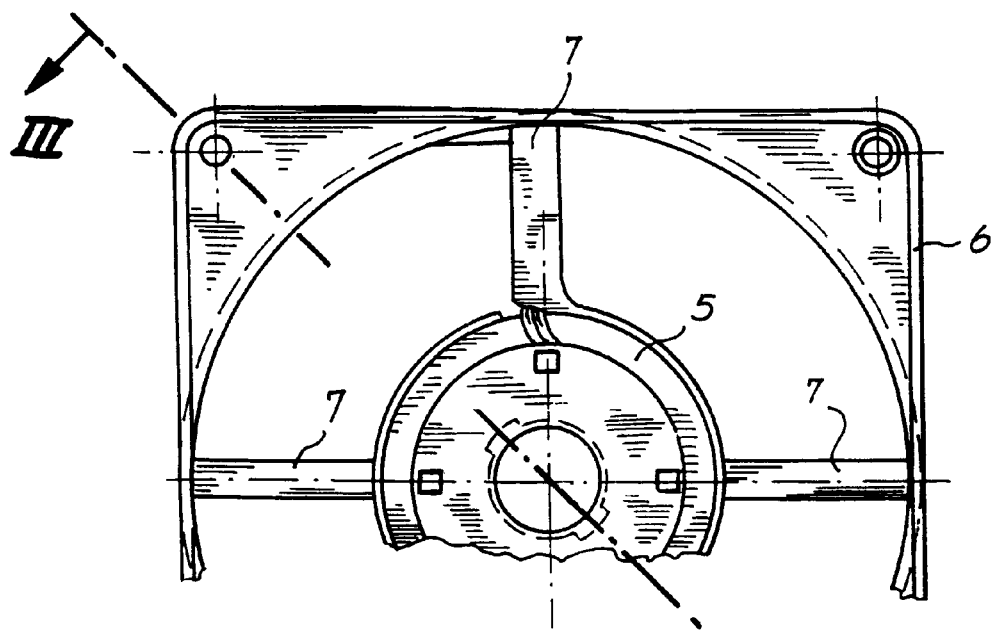
FIG. 4 is a bottom view of a stator according to FIG. 3.

In FIGS. 3 and 4, a fan housing 6 is represented, with a support member or flange 5, ribs 7, and a bearing support tube 4. A stator 1 of an electronically commutated direct current motor is also disposed on the outer circumference of the bearing support tube 4, as described above. These Figs., which clearly show the condition of the stator 1 before the injection molding, should contribute to the better comprehension of this invention.

FIG. 5 shows the stator 1 according to the invention. The contours of the essential parts of the injection molding die 20 have been drawn with dot-and-dash lines. An enlarged depiction of the stator was chosen for the sake of clarity. It shows the different regions of the injection molded coating or cover 9, e.g. the very thin layer surrounding the lamination packet 2. This injection-molded cover became possible only by means of the method steps of the present invention and the selection of material.

FIG. 6 is a section through a completely assembled fan with a stator 1 according to the invention. The stator 1 and its parts have already been described above. The rotor of this motor comprises essentially a rotor magnet 40, a rotor bell 41, and fan hub 42 with fan blades 43 (dot-and-dash lines). Despite the coating or cover 9 even around the lamination packet 2, the invention succeeds in still maintaining an air gap 8 in a mass-produced item, without changing this fact, and this gap permits the operation of the motor, without mechanical finishing on the circumference of the stator 1.

The invention is not limited to the exemplary embodiments shown and described, but rather encompasses all similarly-operating embodiments within the spirit of the invention.

What is claimed is:

1. A method of insulating a stator (1) of an electronically commutated direct current motor, which stator has a core (2) and windings (10) actuated by an associated circuit (11), comprising the steps of:

placing the stator and an associated circuit in an injection molding die (20) having laterally movable jaws (21), closing the movable jaws to define a chamber having walls closely surrounding the stator and circuit, injecting a liquid hot thermoplastic via a supply line (22) into the chamber, to thereby form a thin insulating coating (9) over the core (2) and circuit (11), and retracting the movable jaws (21) and removing the thus-insulated stator and circuit.

2. The method of claim 1, further comprising, prior to said retracting step, pausing until the thermoplastic has solidified into said coating.

3. The method according to claim 1, further comprising cooling the die to speed solidification of said thermoplastic.

4. The method according to claim 1, wherein said stator is shaped for use with an external rotor (40), and said jaws (21) of said die (20) are dimensioned to limit the size of the molding chamber so that the resulting coated stator, when assembled with said external rotor (40), will be radially separated therefrom by an air-gap (8) of predetermined width.

5. The method according to claim 1, further comprising mounting the stator (1) on a supporting member flange (5), and wherein said flange (5) cooperates with said movable jaws (21) to define said chamber into which the thermoplastic is injected.

6. The method according to claim 5, in which the supporting flange (5) essentially extends perpendicular to a rotation axis of the motor, and jaws of the die are pressed essentially perpendicularly against this supporting flange (5) to define the chamber.

7. The method according to claim 1, wherein said thermoplastic is a hot-melt adhesive whose major constituent is a polyamide material.

8. The method according to claim 7, wherein said thermoplastic material is MACROMELT 6790.

9. An injection molding die (20) for coating a stator (1) of an electronically commutated motor having an external rotor (40), while retaining an air gap (8) between stator and rotor, wherein a molding chamber of the die has walls having, in the region of the air gap (8), a spacing from an air-gap-adjacent side of the stator which is smaller than a predetermined desired air gap (8) of the motor.

10. The die of claim 9, which has a receptacle comprised of a centering mandrel (23) and a ram (24) for engaging in and closing a bearing support tube (4) provided on the stator (1), in order to prevent any coating of an interior surface of this bearing support tube (4).

11. A stator (1) for an electronically commutated direct current motor, which stator has a core (2) and windings (10) actuated by an associated circuit (11), made by the steps of:

placing the stator and an associated circuit in an injection molding die (20) having laterally movable jaws (21), closing the movable jaws to define a chamber having walls closely surrounding the stator and circuit, injecting a liquid hot thermoplastic via a supply line (22) into the chamber, to thereby form a thin insulating coating (9) over the core (2) and circuit (11), and retracting the movable jaws (21) and removing the thus-insulated stator and circuit.

12. A stator (1) for an electronically commutated direct current motor with an external rotor (40) separated from said stator by an air gap (8), said stator having an insulating coating (9) on an air-gap-adjacent side thereof, which coating is produced by injection-molding thermoplastic material between this side and an injection molding form (21) disposed opposite it, and wherein the thickness of this coating is smaller than a predetermined desired dimension of said air gap (8) between stator (1) and rotor (40).

13. The stator according to claim 14, which is formed as a stator of an external rotor motor and in which the insulating coating (9) extends from the air gap (8) adjacent side of the stator (1), over the winding (10) to a bearing support tube (4) provided on the stator.

14. The stator according to claim 13, in which an interior surface of said bearing support tube is free of said insulating coating (9).

* * * * *

UNITED STATES PATENT AND TRADEMARK OFFICE
CERTIFICATE OF CORRECTION

PATENT NO : 5,973,424            Page 1 of 2
DATED : October 26, 1999
INVENTOR(S): Engelberger et al.

It is certified that error appears in the above-identified patent and that said Letters Patent is hereby corrected as shown below:

INID [54] Title

PROCESS FOR INSULATING THE STATOR OF AN ELECTRONICALLY SWITCHED D.C. MOTOR should read --METHOD OF INSULATING THE STATOR OF AN ELECTRONICALLY COMMUTATED D.C. MOTOR--

At column 1, line 4, --Field of the Invention-- should be inserted.

At column 1, line 6, "or" should read --of--.

At column 1, line 15, "PAPst" should read --PAPST--.

Signed and Sealed this

Second Day of May, 2000

Attest:

Attesting Officer

Q. TODD DICKINSON

Director of Patents and Trademarks

UNITED STATES PATENT AND TRADEMARK OFFICE
CERTIFICATE OF CORRECTION

PATENT NO : 5,973,424          Page 2 of 2
DATED : October 26, 1999
INVENTOR(S): Engelberger et al.

It is certified that error appears in the above-identified patent and that said Letters Patent is hereby corrected as shown below:

At column 1, line 24, "German Industrail Norm" should read --German Industrial Norm.--

At column 2, line 4, after "space" --12-- should be inserted.

At column 2, line 22, after "right" --,-- should be inserted.

At column 2, line 55, after "is" and after "Figs. 5-6" --,-- should be inserted.

At column 4, line 55, "claim 14" should be claim 12--.